United States Patent [19]

Wright et al.

[11] Patent Number: 5,736,173
[45] Date of Patent: Apr. 7, 1998

[54] PREFORM INJECTION MOULD WITH SLIDE TAPER LOCKS

[75] Inventors: John B. Wright, Alliston; Mark W. Burrows, Georgetown; Walter Kovac, Bolton, all of Canada

[73] Assignee: Zygo Mold Limited, Etobicoke, Canada

[21] Appl. No.: 641,985

[22] Filed: Apr. 24, 1996

[51] Int. Cl.$^6$ .................................................. B29C 45/44
[52] U.S. Cl. .................. 425/577; 264/318; 425/DIG. 58
[58] Field of Search ................................. 425/556, 577, 425/DIG. 58, 450.1; 264/318

[56] References Cited

U.S. PATENT DOCUMENTS

| | | | |
|---|---|---|---|
| 4,889,480 | 12/1989 | Nakamura et al. | 425/DIG. 58 |
| 5,531,588 | 7/1996 | Brun | 425/556 |

*Primary Examiner*—Tim Heitbrink
*Attorney, Agent, or Firm*—Baker & Daniels

[57] ABSTRACT

A preform injection mould includes an elongate mould core cooperating with a female mould and a neck ring in a manner to define a mould cavity therebetween. An injection nozzle in the female mould allows molten plastic to be injected into the mould cavity so that a preform moulded article may be formed. The neck ring is constituted by a pair of mating halves which can be separated laterally with respect to the longitudinal axis of the mould core. A taper sleeve surrounds the mould core beneath the neck ring. The neck ring halves are secured to diametrically opposed slides to facilitate lateral separation of the neck ring. A pair of slide taper locks contact a respective one of the slides to inhibit lateral movement of the slides and to back up the neck ring when injection mould is in a mould closed position. An annular formation is formed on the upper surface of the neck ring and is accommodated by a complementary recess formed in the bottom of the female mould. The mating inclined surfaces of the female mould and the annular formation constitute an upper taper lock which is backed up by a cavity plate. An annular formation is provided on the upper surface of the taper sleeve and is accommodated by a complimentary recess formed in the bottom of the neck ring. The mating inclined surfaces of the taper sleeve and neck ring constitute a lower taper lock. Since a portion of the neck ring constitutes the female taper of the lower taper lock, the lower taper lock is backed up by the slide taper locks through the slides allowing the cross-sectional area of the neck ring to be reduced.

13 Claims, 5 Drawing Sheets

PREFORM INJECTION MOULD WITH SLIDE TAPER LOCKS

FIELD OF THE INVENTION

The present invention relates to injection moulding and in particular to a preform injection mould having slide taper locks and to an assembly for a preform injection mould.

BACKGROUND OF THE INVENTION

Preform injection moulds are well known in the art. One popular preform injection mould design includes a female mould and a neck ring which surround a mould core. A mould cavity is defined by the space between the female mould, neck ring and mould core into which molten plastic is injected to form a preform moulded article. The neck ring has an internal surface configured to define the threaded, undercut or beaded portion of the preform moulded article. In order to allow the threaded, undercut or beaded portion of the preform moulded article to be released from the injection mould, the neck ring is constituted by a pair of mating halves which are separated laterally with respect to the longitudinal axis of the mould core when the injection mould is in a mould open position.

The neck ring includes an upper annular formation having an upwardly and inwardly inclined outer surface. The upper annular formation is received by a complementary recess formed in the female mould to maintain alignment of the female mould and the neck ring. The portion of the female mould which surrounds the upper annular formation constitutes the female taper of an upper taper lock. A cavity plate surrounds the female mould to back up the upper taper lock.

The neck ring also includes a lower annular formation having a downwardly and inwardly inclined outer surface. The bottom of the lower annular formation contacts the mould core to position the mould core properly relative to the female mould and neck ring. A lock ring is positioned beneath the neck ring and has a complementary recess formed therein to accommodate the lower annular formation. The portion of the lock ring which surrounds the lower annular formation constitutes the female taper of a lower taper lock. Diametrically opposed slides are secured to the halves of the neck ring to facilitate separation of the neck ring halves when the injection mould is conditioned to the mould open condition.

In operation, molten plastic is injected into the mould cavity to form a preform moulded article. During injection of the molten plastic, significant internal pressure is applied to the female mould and the neck ring. Due to the significance of the internal pressure, the female tapers of the upper and lower taper locks must be sufficiently strong to withstand the internal pressure. With respect to the female taper of the upper taper lock, the cavity plate provides sufficient backup to the female taper to inhibit the female taper from breaking while still allowing its cross-sectional area to be kept small. However, with respect to the lower taper lock, the lock ring, which constitutes the female taper, is not backed up. Therefore, in order to deal with the internal pressure applied to the neck ring, the cross-sectional area of the female taper must be kept sufficiently large to withstand the pressure forces applied to it by the neck ring. Unfortunately, the dimension of the female taper establishes the maximum diameter of the preform moulded article which may be formed in the injection mould. Therefore, if it is desired to create preform moulded articles with larger diameters, a new injection mould with a larger pitch and having an overall larger physical size must be purchased. This may of course necessitate the purchase of a new injection moulding machine to accommodate the larger injection mould.

It is therefore, an object of the present invention to provide a novel injection mould and an assembly for a preform injection mould.

SUMMARY OF THE INVENTION

According to one aspect of the present invention there is provided a preform injection mould for forming a preform moulded article comprising:

a mould core;

a female mould surrounding said mould core;

a taper sleeve surrounding said mould core;

a neck ring surrounding said mould core and positioned between said female mould and said taper sleeve, said female mould and neck ring surrounding said mould core in a manner to define a mould cavity therebetween into which molten plastic is injected to form said preform moulded article, said neck ring being separable into parts through movement of said parts away from a longitudinal axis of said mould core;

a first taper constituted by mating portions of said neck ring and said female mould;

a second taper constituted by mating portions of said neck ring and said taper sleeve; and means exterior to said female mould, neck ring and lock ring to back up said first and second tapers.

Preferably, each of the first and second tapers includes a male taper and a female taper, a portion of the neck ring constituting the male taper of the first taper and being accommodated by the female mould and a portion of the neck ring constituting the female taper of the second taper and accommodating a portion of the taper sleeve. It is also preferred that the parts of the neck ring are secured to slides to facilitate lateral separation of the neck ring and that the back up means includes slide locks abutting the slides when the injection mould is in a mould closed position to inhibit lateral movement of the slides and to back up the second taper. In one embodiment, the slide locks and slides have mating inclined surfaces.

Preferably, the back up means further includes a cavity plate surrounding the female mould to back up the first taper. It is also preferred that the male taper of the first taper is in the form of an annular formation on the neck ring having an inwardly inclined outer surface and that the female mould has a complimentary recess formed therein for accommodating the annular formation. The male taper of the second taper is also in the form of an annular formation on the taper sleeve. The neck ring has a complimentary recess formed therein for accommodating the annular formation on the taper sleeve.

According to another aspect of the present invention there is provided a preform injection mould for forming a preform moulded article comprising:

an elongate generally upright mould core;

a female mould surrounding said mould core and having an injection nozzle therein;

a taper sleeve below said female mould and surrounding said mould core;

a neck ring positioned between said female mould and said taper sleeve and surrounding said mould core, said female mould and neck ring surrounding said mould core in a manner to define a mould cavity therebetween into which molten plastic is injected via said injection nozzle to form said preform moulded article, said neck ring being separable laterally into halves with respect to a longitudinal axis of said mould core;

an upper taper constituted by mating portions of said neck ring and said female mould;

a lower taper constituted by mating portions of said neck ring and said taper sleeve; and means exterior to said female mould, neck ring and taper sleeve to back up said upper and lower tapers.

According to still yet another aspect of the present invention there is provided in a preform injection mould having a mould core; a female mould; a neck ring at one end of said female mould and being separable into parts away from said mould core; a mould cavity formed between said mould core and said female mould and neck ring; a taper sleeve at one end of said neck ring; tapers constituted by mating portions of said neck ring and female mould and said neck ring and sleeve, the improvement comprising:

means exterior to said female mould, neck ring and sleeve to back up said tapers.

In still yet another aspect of the present invention there is provided an assembly for a preform injection mould having a mould core and a female mould surrounding said mould core, said assembly comprising:

a taper sleeve surrounding said mould core;

a neck ring surrounding said mould core and positioned between said female mould and said taper sleeve, said female mould and neck ring surrounding said mould core in a manner to define a mould cavity therebetween into which molten plastic is injected to form said preform moulded article, said neck ring and said female mould including complimentary formations defining a first taper, said neck ring being separable into parts through movement of said parts away from a longitudinal axis of said mould core;

a second taper constituted by mating portions of said neck ring and taper sleeve; and means exterior to said neck ring and said taper sleeve to back up said second taper.

The present invention provides advantages in that since injection pressure forces applied to the neck ring at the lower taper are transferred to the slides and are in turn taken up by the slide taper locks acting on the outer surfaces of the slides, the cross-sectional area of the neck ring can be reduced. This allows for the formation of larger diameter preform moulded articles in the preform injection mould. Existing preform injection moulds can be retrofitted to incorporate the assembly allowing an existing preform injection mould to form larger preform moulded articles without requiring a new preform injection mould to be purchased. The present invention also provides advantages in that since the inclined surface of a portion of the neck ring forms the female taper of the lower taper, wear on the neck ring is reduced.

BRIEF DESCRIPTION OF THE DRAWINGS

An embodiment of the present invention will now be described more fully with reference to the accompanying drawings in which.

DESCRIPTION OF THE PREFERRED EMBODIMENTS

Figure 1:
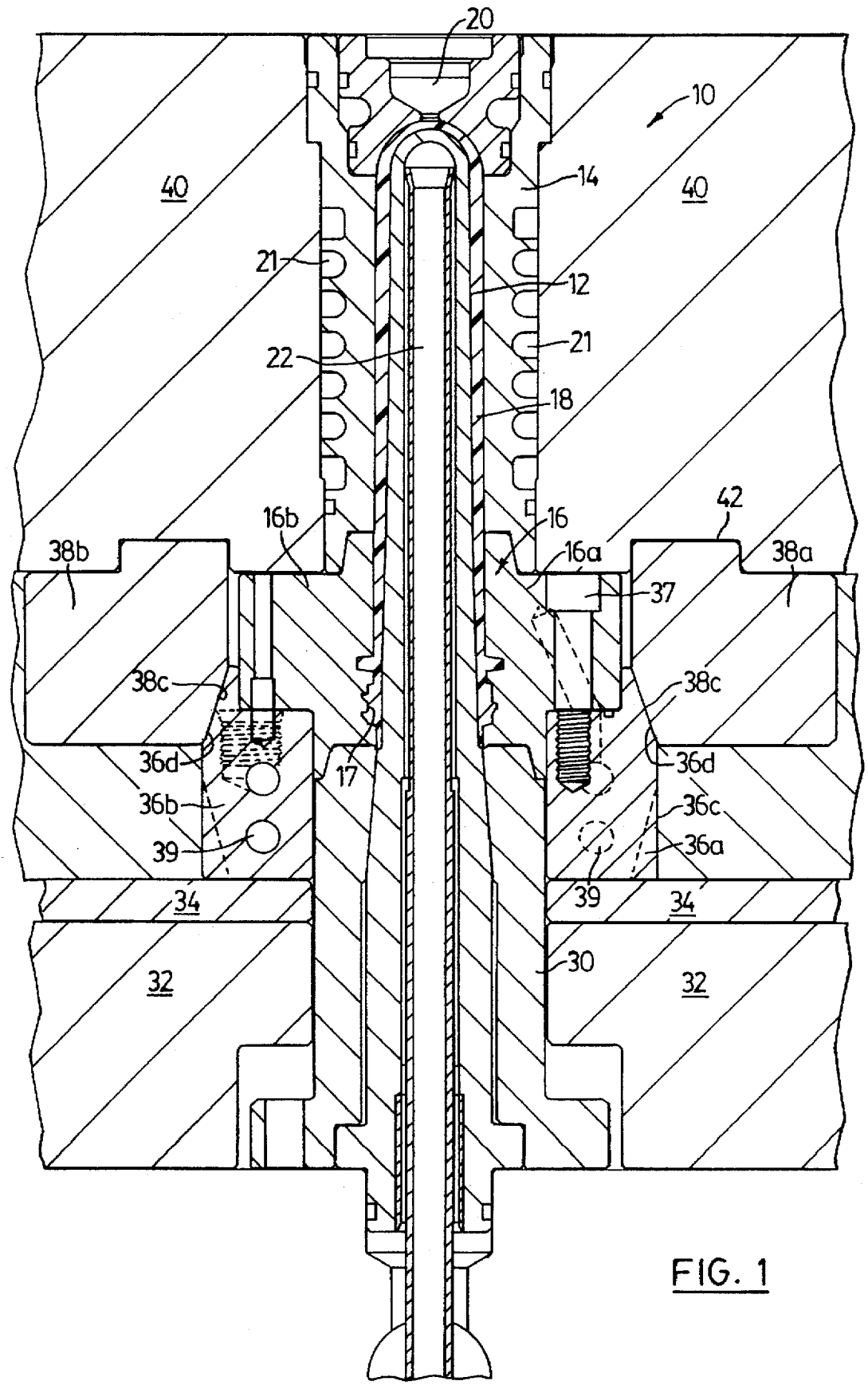
FIG. 1 is a cross-sectional view of a preform injection mould in accordance with the present invention.

Referring now to FIG. 1, a preform injection mould in accordance with the present invention is shown and is generally indicated to by reference numeral 10. In this Figure, the injection mould 10 is illustrated in a mould closed position. The injection mould 10 includes an elongate mould core 12 co-operating with a female mould 14 and a neck ring 16 in a manner to define a mould cavity 18 therebetween. An injection nozzle 20 is provided in the female mould 14 to allow molten plastic to be injected into the mould cavity 18 so that a preform moulded article may be formed. Cooling channels 21 are provided in the female mould 14 to receive a flow of coolant, such as for example water, to cool the preform moulded article being formed in the mould cavity 18. The mould core 12 also has cooling channels 22 within it to receive a flow of coolant to cool the preform moulded article being formed in the mould cavity 18.

The neck ring 16 has an internal surface 17 configured to define the threaded, undercut or beaded portion of the preform moulded article. In order to allow the threaded, undercut or beaded portion of the preform moulded article to be released from the injection mould 10, the neck ring 16 is constituted by a pair of mating halves 16a and 16b which can be separated laterally with respect to the longitudinal axis of the mould core 12.

Surrounding the mould core 12 beneath the neck ring 16 is a taper sleeve 30. A stripper plate 32 surrounds the taper sleeve 30 and supports a wear plate 34 on its upper surface. A pair of diametrically opposed slides 36a and 36b are supported by the wear plate 34. Each neck ring half 16a and 16b is secured to a respective one of the slides 36a and 36b by a suitable fastener 37 to facilitate lateral separation of the neck ring halves. The outer surface 36c of each slide includes an inclined portion 36d. The slides 36a and 36b also have cooling channels 39 within them to receive a flow of coolant to cool the preform moulded article being formed in the mould cavity 18. A pair of slide taper locks 38a and 38b contact a respective one of the slides 36a and 36b to inhibit lateral movement of the slides and to back up the neck ring 16 when the injection mould 10 is in a mould closed position and a preform moulded article is being formed. Each slide taper lock 38a and 38b includes an inclined surface 38c complimentary to the inclined portion 36d. A cavity plate 40 surrounds the female mould 14 and has recesses formed in it to accommodate heels 42 on the upper surfaces of the slide taper locks 38a and 38b. Fasteners (not shown) secure the slide taper locks 38a and 38b to the cavity plate 40.

Figure 2:
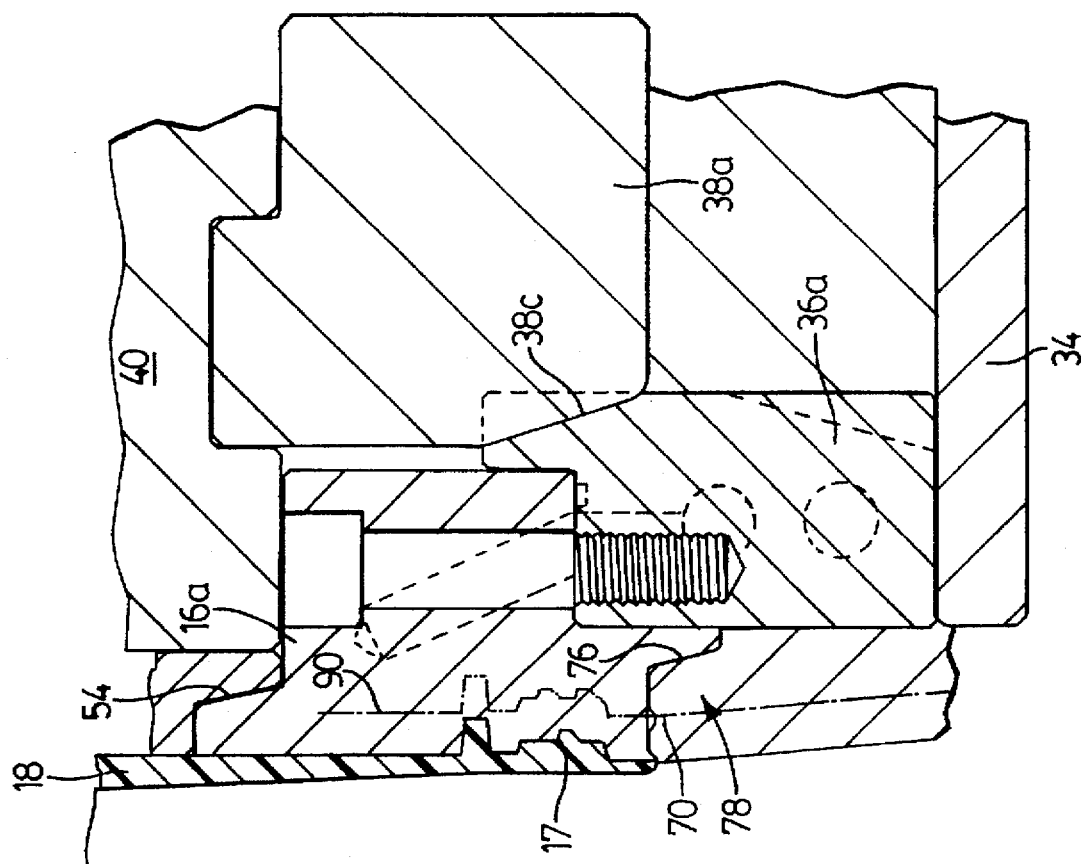
FIG. 2 is an enlarged cross-sectional view of a portion of the preform injection mould of FIG. 1.
Figure 2:
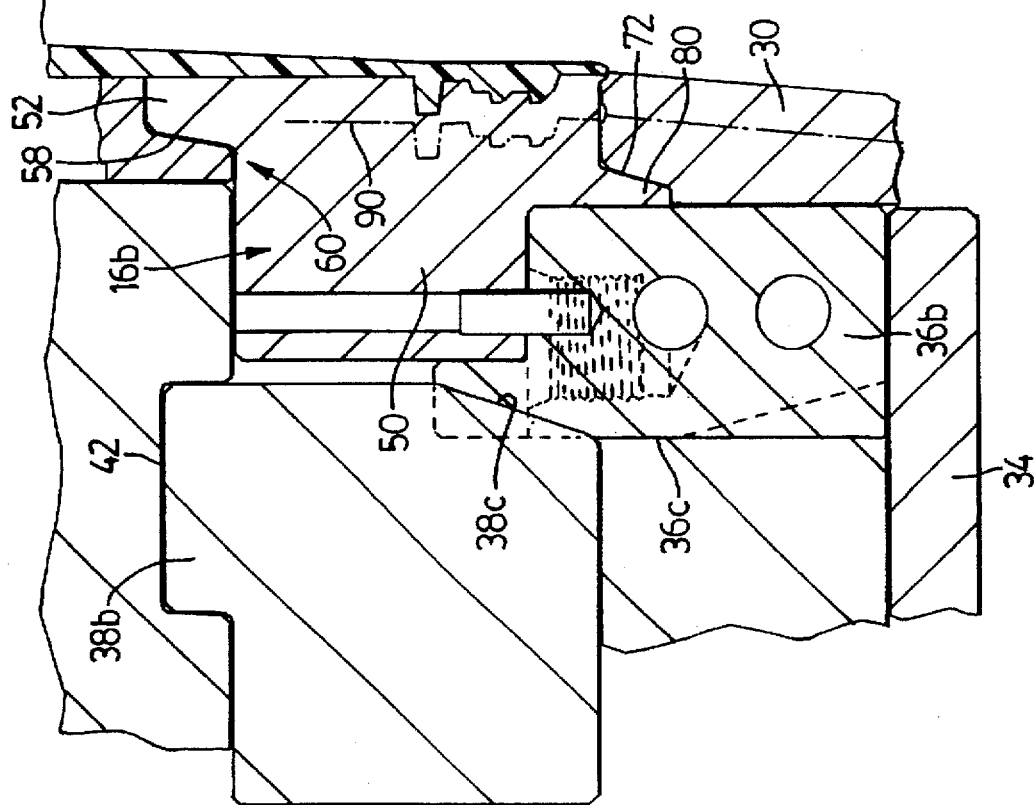

Referring now to FIG. 2, the configurations of the neck ring 16, taper sleeve 30 and female mould 14 are better illustrated. As can be seen, the neck ring 16 includes a central body portion 50 having an annular formation 52 on its upper surface. The outer surface 54 of the annular formation 52 is upwardly and inwardly inclined. The annular formation 52 is accommodated by a complimentary recess 56 formed in the bottom of the female mould 14 (see FIG. 3). The mating inclined surfaces 58 and 54 of the female mould 14 and annular formation 52 respectively constitute an upper taper lock 60 which is backed up by the cavity plate 40. The annular formation 52 constitutes the male taper of the upper taper lock 60 while the portion 62 of female mould 14 surrounding the annular formation 52 constitutes the female taper of the upper taper lock 60.

The upper end of the taper sleeve 30 terminates in an annular formation 70 having an upwardly and inwardly inclined outer surface 72. A complimentary recess 74 is formed in the bottom of the neck ring 16 and accommodates the annular formation 70 (see FIG. 3). The mating inclined surfaces 72 and 76 of the taper sleeve 30 and neck ring 16 constitute a lower taper lock 78. The annular formation 70 constitutes the male taper of the lower taper lock 78 while the portion 80 of the neck ring 16 surrounding the annular formation 70 constitutes the female taper of the lower taper lock 78.

In operation with the preform injection mould 10 conditioned to the mould closed position, molten plastic is injected into the mould cavity 18 by way of the injection nozzle 20. As the molten plastic is injected into the mould cavity internal pressure forces are applied against the internal surfaces of the female mould 14 and the neck ring 16. The pressure forces applied to the female mould 14 and neck ring at the upper taper lock 60 are transmitted to the cavity plate 40 which backs up the upper taper lock 60. Since the upper taper lock 60 is backed up by the cavity plate 40, the cross-sectional area of the female taper 62 can be relatively small.

The pressure forces applied to the neck ring 16 adjacent the lower taper lock 78 are transmitted to the taper slide locks 38a and 38b by way of the slides 36a and 36b. Because the neck ring 16 is in direct contact with the slides 36a and 36b which are backed up by the slide taper locks, the cross-sectional area of the neck ring 16 can be reduced as shown by the dotted lines 90 allowing larger preform moulded articles to be made without increasing the size of the injection mould. Also, wear on the neck ring 16 is reduced since the outside of the neck ring is not forced against the taper sleeve 30 under internal pressure forces. This design overcomes the disadvantages associated with prior art preform injection moulds.

Figure 3:
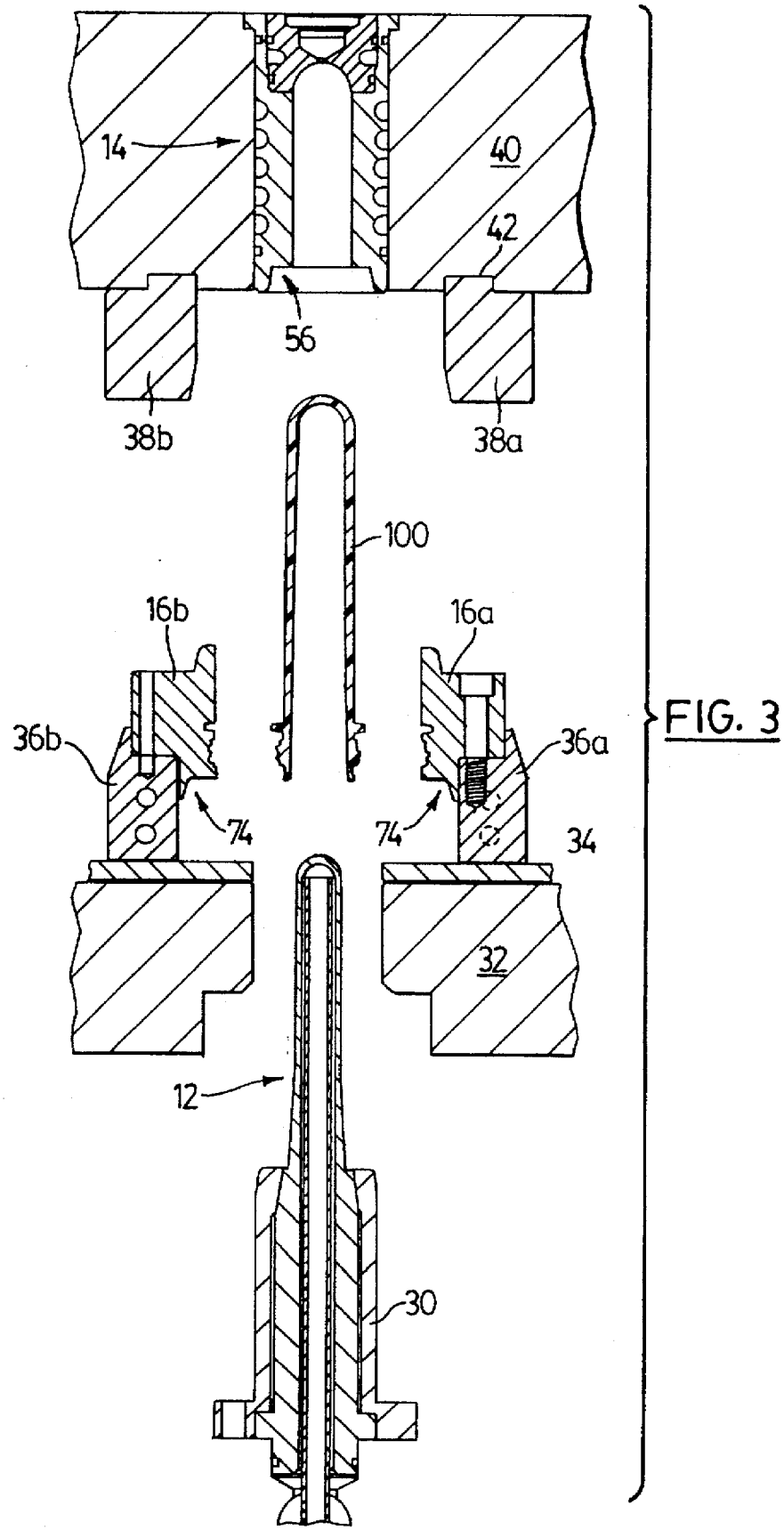
FIG. 3 is a cross-sectional view of the preform injection mould of FIG. 1 in a mould open position.

While the molten plastic is being injected into the mould cavity 18, coolant is circulated through the cooling channels 21, 22 and 39 to cool rapidly the preform moulded article. Once the preform moulded article is cooled, the injection mould is conditioned to a mould open condition as shown in FIG. 3. During transition of the injection mould 10 from the mould closed condition to the mould open condition, the female mould 14, cavity plate 40 and slide taper locks 38a and 38b are lifted from the mould core 12 in an axial direction.

Once the slide taper locks 38a and 38b have been lifted to clear the slides 36a and 36b, the stripper plate 32, wear plate 34, neck ring 16 and slides 36a and 36b are lifted axially above the mould core 12. The slides are then pulled apart radially over the wear plate 34 to separate the halves 16a and 16b of the neck ring 16 to release the threaded, undercut or beaded portion of the preform moulded article. At this time, the preform moulded article 100 is removed from the injection mould 10.

Figure 4:
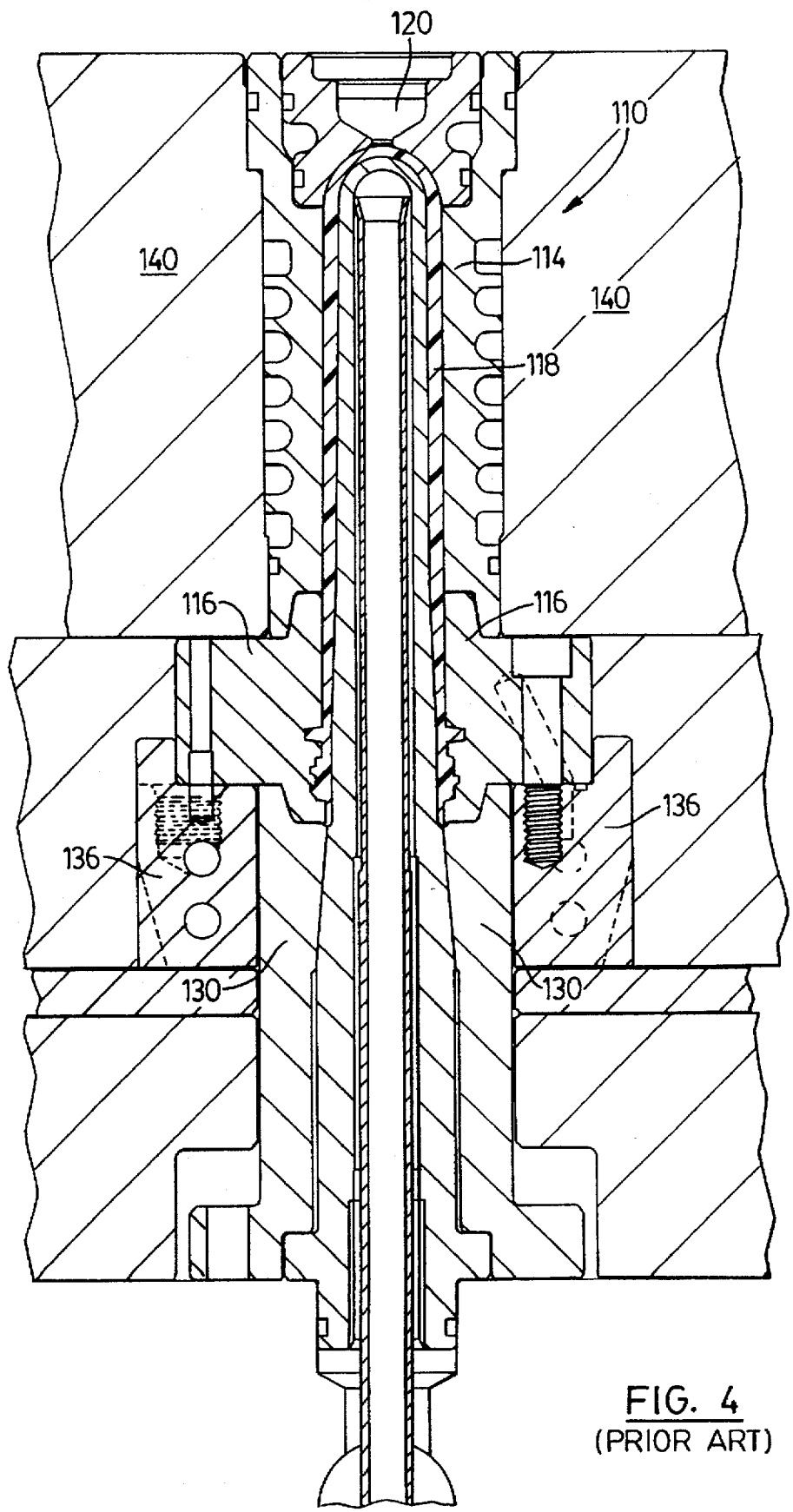
FIG. 4 is a cross-sectional view of a prior art preform injection mould.
Figure 5:
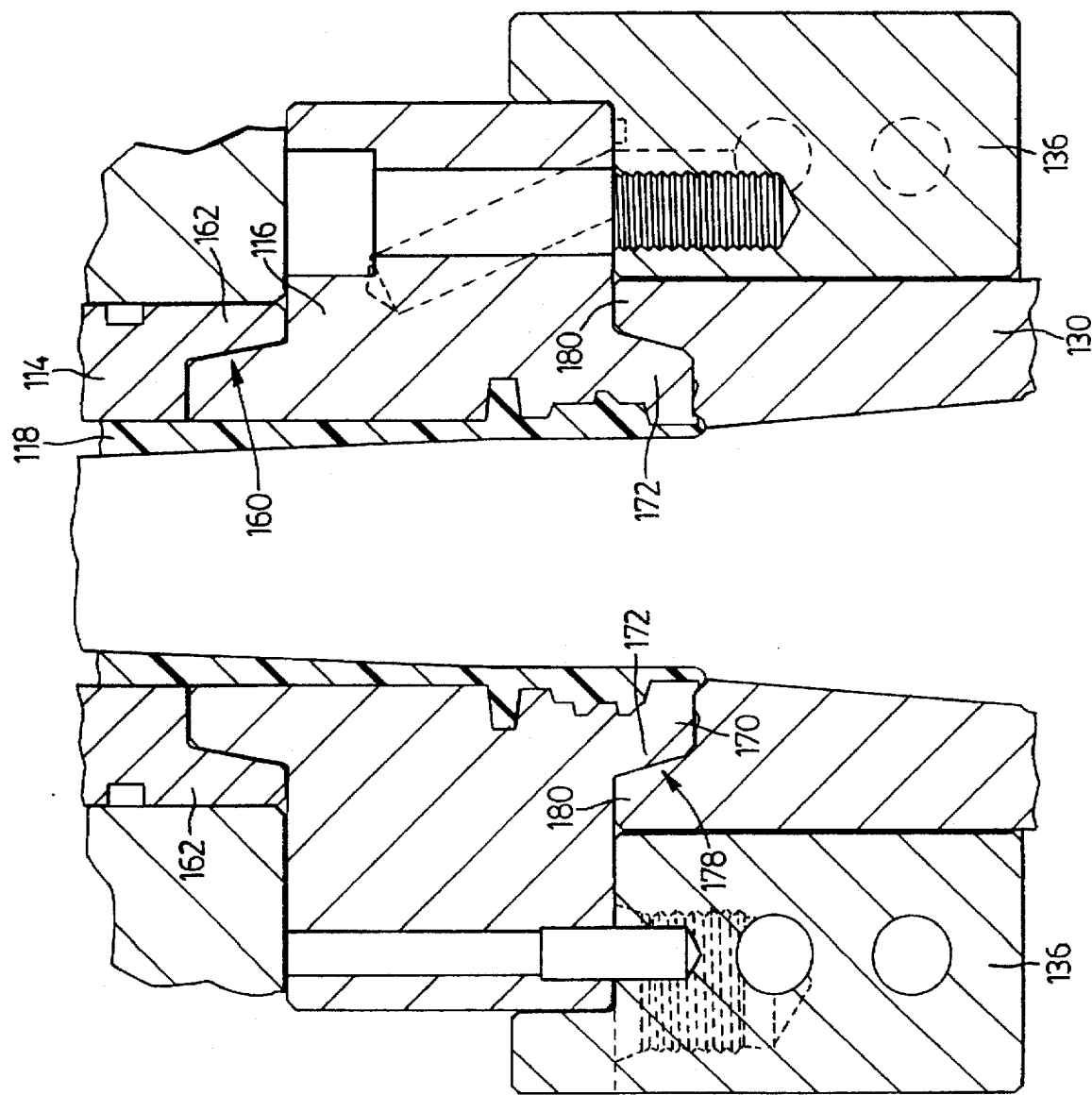
FIG. 5 is an enlarged cross-sectional view of a portion of the prior art preform injection mould of FIG. 3.

Referring now to FIGS. 4 and 5, a prior art preform injection mould 110 of the type described previously is shown. As can be seen, similar to the injection mould 10, the female taper 162 of the upper taper lock 160 is constituted by a portion of the female mould 114 and is backed up by a cavity plate 140. However, unlike the injection mould 10, the neck ring 116 has an annular formation 170 on its bottom surface which is accommodated by a complimentary recess formed in the top surface of a lock ring 130. The annular formation 170 has a downwardly and inwardly inclined outer surface 172 and constitutes the male taper of the lower taper lock 178. The portion 180 of the lock ring 130 surrounding the annular formation 170 constitutes the female taper of the lower taper lock 178.

When the injection mould 110 is in a mould closed position and molten plastic is injected into the mould cavity 118 by way of the injection nozzle 120, pressure forces are applied against the female mould 114 and the neck ring 116. The pressure forces applied to the female mould 114 and neck ring 116 at the upper taper lock 160 are transmitted to the cavity plate 140 which backs up the upper taper lock 160.

However, pressure forces applied to the neck ring 116 at the lower taper lock 178 are transmitted to the female taper 180 of the lock ring 130. Since the lock ring 130 is not backed up, its cross-sectional area must be sufficient to withstand these pressure forces. This of course sets a limit on the maximum diameter of a preform moulded article that may be formed in the injection mould 110.

As those of skill in the art will appreciate, with respect to the present invention, the female taper on the neck ring at the lower taper lock allows the lower taper lock to be backed up through the slides. This of course allows the cross-sectional area of the neck ring to be reduced and therefore, allows larger preform moulded articles to be made in the injection mould.

The neck ring 16, taper sleeve 30, slides 36a and 36b and slide taper locks 38a and 38b can be retrofitted in an existing preform injection mould to allow the existing injection mould to form larger preform moulded articles while avoiding the need to purchase a larger, new injection mould as was required in the past.

Although the injection mould 10 has been described as having cooling channels in the female mould, mould core and slides, those of skill in the art will appreciate that cooling channels may also be provided in the neck ring 16 if the size of the neck ring is sufficient.

Although a particular embodiment of the present invention has been described, those of skill in the art will appreciate that variations and modifications may be made thereto without departing from the spirit and scope thereof as defined by the appended claims.

We claim:

1. A preform injection mould for forming a preform moulded article comprising:

a mould core assembly;

a female mould moveable axially relative to said mould core assembly;

a neck ring constituted by separable neck ring parts moveable radially relative to said mould core assembly and positioned between said female mould and said mould core assembly, said female mould and neck ring surrounding a portion of said mould core assembly when said injection mould is in a mould closed condition in a manner to define a mould cavity therebetween into which molten plastic is injected to form said preform moulded article, said female mould being axially spaced from both said mould core assembly and said neck ring and said neck ring parts being separated and radially spaced from said mould core assembly when said injection mould is in a mould open condition;

a first taper lock constituted by mating portions of said neck ring and said female mould when said injection mould is in said mould closed condition;

a second taper lock constituted by said mating portions of said neck ring and said mould core assembly when said injection mould is in said mould closed condition, said second taper lock including a female taper defined by a portion of said neck ring and a complimentary male taper defined by said mould core assembly;

slides secured to said neck ring parts and being moveable to move said neck ring parts radially;

slide locks to abut said slides when said injection mould is in said mould closed condition to inhibit radial movement of said slides and to back up said second taper lock; and a drive to move said female mould axially relative to said mould core assembly and to move said slides to move radially said neck ring parts to actuate said injection mould between said mould closed and mould open conditions.

2. An injection mould as defined in claim 1 wherein said slide locks and slides have mating inclined surfaces.

3. An injection mould as defined in claim 2 wherein a portion of said neck ring constituting the male taper of said first taper lock is accommodated by said female mould.

4. An injection mould as defined in claim 3 further including a cavity plate surrounding said female mould to back up said first taper lock.

5. A preform injection mould as defined in claim 4 wherein said mould core assembly includes a mould core and a taper sleeve surrounding a portion of said mould core.

6. An injection mould as defined in claim 5 wherein the male taper of said first taper lock is in the form of an annular formation on said neck ring having an inwardly inclined outer surface, said female mould having a complimentary recess formed therein for accommodating said annular formation and wherein the male taper of said second taper lock is in the form of an annular formation on said taper sleeve.

7. A preform injection mould for forming a preform moulded article comprising:

an elongate mould core;

a female mould moveable axially relative to said mould core and having an injection nozzle therein;

a taper sleeve surrounding a portion of said mould core;

a neck ring constituted by a pair of separable neck ring halves moveable radially relative to said mould core and positioned between said female mould and said taper sleeve, said female mould and neck ring surrounding a portion of said mould core assembly when said injection mould is in a mould closed condition in a manner to define a mould cavity therebetween into which molten plastic is injected via said injection nozzle to form said preform moulded article, said female mould being axially spaced from both said mould core assembly and said neck ring and said neck ring halves being separated and radially spaced from said mould core assembly when said injection mould is in a mould open condition;

a first taper lock constituted by mating portions of said neck ring and said female mould when said injection mould is in said mould closed condition;

a second taper lock constituted by said mating portions of said neck ring and said taper sleeve when said injection mould is in said mould closed condition, said second taper lock including a female taper defined by a portion of said neck ring and a male taper defined by said taper sleeve;

slides secured to said neck ring halves and being moveable to move said neck ring halves radially;

slide locks to abut said slides when said injection mould is in said mould closed condition to inhibit radial movement of said slides and to back up said second taper lock; and a drive to move said female mould axially relative to said mould core assembly and to move said slides to move radially said neck ring halves to actuate said injection mould between said mould closed and mould open conditions.

8. An injection mould as defined in claim 7 wherein a portion of said neck ring constituting the male taper of said upper taper lock is accommodated by said female mould.

9. An injection mould as defined in claim 7 wherein said slide locks and slides have mating inclined surfaces.

10. An injection mould as defined in claim 9 further including a cavity plate surrounding said female mould to back up said upper taper lock.

11. An injection mold as defined in claim 10 wherein the male taper of said upper taper lock is in the form of an annular formation on said neck ring having an inwardly inclined outer surface, said female mould having a complimentary recess formed therein for accommodating said annular formation and wherein the male taper of said lower taper lock is in the form of an annular formation on said taper sleeve.

12. An assembly for a preform injection mould having a mould core assembly and a female mould moveable axially relative to said mould core assembly, said assembly comprising:

a neck ring constituted by separable neck ring parts moveable radially relative to said mould core assembly and positioned between said female mould and said mould core assembly, said female mould and neck ring surrounding a portion of said mould core assembly when said injection mould is in a mould closed condition in a manner to define a mould cavity therebetween into which molten plastic is injected to form said preform moulded article, said female mould being axially spaced from both said mould core assembly and said neck ring and said neck ring parts being separated and radially spaced from said mould core assembly when said injection mould is in a mould open condition;

a first taper lock constituted by mating portions of said neck ring and said female mould when said injection mould is in said mould closed condition;

a second taper lock constituted by said mating portions of said neck ring and said mould core assembly when said injection mould is in said mould closed condition, said second taper lock including a female taper defined by a portion of said neck ring and a complementary male taper defined by said mould core assembly;

slides secured to said neck ring parts and being moveable to move said neck ring parts radially;

slide locks to abut said slides when said injection mould is in said mould closed condition to inhibit radial movement of said slides and to back up said second taper lock; and a drive to move said female mould axially relative to said mould core assembly and to move said slides to move radially said neck ring parts to actuate said injection mould between said mould closed and mould open conditions.

13. An assembly as defined in claim 12 wherein said slide locks and slides have mating inclined surfaces.

* * * * *